(12) United States Patent
Wisse et al.

(10) Patent No.: US 12,336,454 B2
(45) Date of Patent: Jun. 24, 2025

(54) SELF PROPELLED MOWER WITH SAFETY DEVICE

(71) Applicant: LELY PATENT N.V., Maassluis (NL)

(72) Inventors: Dik-Jan Wisse, Maassluis (NL); Ruth De Jong, Maassluis (NL)

(73) Assignee: LELY PATENT N.V., Maassluis (NL)

(*) Notice: Subject to any disclaimer, the term of this patent is extended or adjusted under 35 U.S.C. 154(b) by 765 days.

(21) Appl. No.: 17/616,053

(22) PCT Filed: Jun. 19, 2020

(86) PCT No.: PCT/NL2020/050397
§ 371 (c)(1),
(2) Date: Dec. 2, 2021

(87) PCT Pub. No.: WO2020/263081
PCT Pub. Date: Dec. 30, 2020

(65) Prior Publication Data
US 2022/0295709 A1     Sep. 22, 2022

(30) Foreign Application Priority Data

Jun. 26, 2019 (NL) .................................... 2023389

(51) Int. Cl.
*A01D 34/00* (2006.01)
*A01D 75/18* (2006.01)
(Continued)

(52) U.S. Cl.
CPC ......... *A01D 75/185* (2013.01); *A01D 34/008* (2013.01); *A01D 90/16* (2013.01); *A01D 2101/00* (2013.01)

(58) Field of Classification Search
CPC .... A01D 34/008; A01D 34/81; A01D 75/185; A01D 90/16; B60L 1/003; B60L 8/003;
(Continued)

(56) References Cited

U.S. PATENT DOCUMENTS 5,323,593 A * 6/1994 Cline .................. A01D 34/008
56/11.9
7,543,474 B2 * 6/2009 Bieck ..................... H01H 3/142
73/11.01
(Continued)

FOREIGN PATENT DOCUMENTS

EP    0 628 239 A1    12/1994
GB      905116 A      9/1962
GB    2 334 875 A     9/1999

OTHER PUBLICATIONS

International Search Report for PCT/NL2020/050397 mailed on Sep. 16, 2020.
(Continued)

*Primary Examiner* — Adam J Behrens
*Assistant Examiner* — Robert E Pezzuto
(74) *Attorney, Agent, or Firm* — Birch, Stewart, Kolasch & Birch, LLP

(57) ABSTRACT

An autonomous self-propelled mowing vehicle includes a frame fitted with a drive mechanism, a mowing device for mowing plants, a bumper device, and a control unit. The bumper device includes a first and a second impact detector. The first impact detector is depressible up to a stop and is provided with a first switch which emits a first signal to the control unit at a first switching point, if the first impact detector is depressed beyond the switching point. The second impact detector is deformable and locally depressible, and is provided with a second switch which emits a second signal to the control unit if the second impact detector is depressed at least beyond a predetermined depression threshold. The control unit is configured to stop the drive mechanism upon receiving the second signal, and to regulate the drive mechanism in such a way that the speed of the mowing vehicle is reduced to a lower mowing speed upon receiving the first signal without receiving the second signal.

(Continued)

This prevents plants to be mowed from pushing the bumper away across the bumper width beyond the switching point of the first impact detector, without losing its long depressibility, because the second impact detector, which itself has a much smaller depressibility, detects obstacles at the lower (mowing) speed by being depressed itself.

19 Claims, 2 Drawing Sheets

(51) Int. Cl.
  *A01D 90/16* (2006.01)
  *A01D 101/00* (2006.01)
(58) Field of Classification Search
  CPC .......... B60L 50/52; B60L 50/66; B60L 58/14; G05D 1/0227
  See application file for complete search history.

(56) References Cited

U.S. PATENT DOCUMENTS

| | | |
|---|---|---|
| 2009/0164123 A1 | 6/2009 | Moriguchi |
| 2013/0241217 A1* | 9/2013 | Hickey ................ B25J 19/0091 |
| | | 293/117 |
| 2016/0128275 A1* | 5/2016 | Johnson ............... G05D 1/0227 |
| | | 700/258 |
| 2019/0090427 A1 | 3/2019 | Broderick |
| 2020/0262385 A1* | 8/2020 | Lang ................... B60R 21/0132 |

OTHER PUBLICATIONS

Written Opinion of the International Searching Authority for PCT/NL2020/050397 (PCT/ISA/237) mailed on Sep. 16, 2020.

* cited by examiner

SELF PROPELLED MOWER WITH SAFETY DEVICE

BACKGROUND OF THE INVENTION

1. Field of the Invention

The present invention relates to an autonomous self-propelled mowing vehicle, comprising a frame fitted with a drive mechanism for driving the mowing vehicle in a direction of travel, a mowing device for mowing plants situated on the land, a bumper device, and a control unit for the mowing vehicle which is operatively connected to the bumper device and to the drive mechanism, wherein the bumper device comprises a first impact detector, wherein the impact detector is depressible along a path with respect to the frame up to a stop on account of a force acting thereon, and is provided with a first switch which is connected to the control unit and is configured to emit a signal to the control unit if the impact detector is pushed in beyond a switching point, wherein the control unit is configured to stop the drive mechanism upon receiving the signal.

2. Description of Background Art

Many autonomous self-propelled mowing vehicles have an impact detector ("bumper") and emergency stop feature, often this is even a legal requirement.

A drawback of such systems is that, particularly in the case of mowing, the impact detector is already being pushed in by the plants to be mowed, causing the mowing vehicle to stall. Adjusting the settings of the impact detector to prevent this from happening often does not work, because it is forbidden by law, in order to avoid the detector not being activated in case of a collision with a child or pet. Placing the impact detector in a higher position, that is to say above the plants to be mowed, does not work, as this is also undesirable or even forbidden due to safety concerns.

It is an object of the present invention to provide a mowing vehicle of the type described in the introduction comprising a useful collision protection which does not have the drawbacks indicated.

The invention achieves this object by means of an autonomous self-propelled mowing vehicle as claimed in claim 1, in particular an autonomous self-propelled mowing vehicle, comprising a frame fitted with a drive mechanism for driving the mowing vehicle in a direction of travel at a speed of travel during driving, a mowing device for mowing plants situated on the land, a bumper device, and a control unit for the mowing vehicle which is operatively connected to the bumper device and to the drive mechanism, wherein the bumper device comprises a first impact detector, and a second impact detector, wherein the first impact detector is depressible as a whole along a path with respect to the frame up to a stop on account of a force acting thereon, and is provided with a first switch which is connected to the control unit and is configured to emit a signal to the control unit if the impact detector is pushed in beyond a switching point, wherein the second impact detector is deformable and locally depressible beyond a depressibility on account of a force acting thereon, and is provided with a second switch which is connected to the control unit and which emits a second signal to the control unit if the second impact detector is depressed to at least a predetermined extent, wherein the control unit is configured to stop the drive mechanism upon receiving the second signal, and to regulate the drive mechanism in such a way that the speed is reduced to a lower speed of travel upon receiving the first signal without receiving the second signal.

In this case, the inventors base themselves on the view that large numbers of plants, such as tall grass, alfalfa, etc., together can exert a counterforce on the first impact detector in a predicted, but undesirable manner. This first impact detector has to be able to detect an obstacle at every point along its width and react thereto, and is therefore a rigid unit which is movable as a whole. However, because the plants will act across the entire width, the combined forces together will be sufficient to move the first impact detector beyond the switching point. It will be clear that a mower which is forced to stop by the plants themselves is not feasible. But the collision behavior of plants differs fundamentally from a collision with a more or less hard obstacle. In the latter case, a force is exerted on the first impact detector which, as such, is similar or greater, but is much more localized, i.e. has a higher pressure. For this reason, a second impact detector is used which is more sensitive to pressure and which is activated at a predetermined pressure of depression. To this end, this second impact detector is locally depressible and deformable. It should be noted that in exceptional cases, such as driving towards a wall or the like at right angles thereto, the pressure is not localized. In such a case, the total collision force will nevertheless be high, but in practice this will rarely happen, if at all, and certainly not with a human or animal.

In principle, it would also be possible to only use such a pressure-sensitive impact detector, wherein the first impact detector is only depressible without emitting a signal. This has the drawback that the depression which is still available is not well-defined. After all, the second impact detector in itself is not sufficient to safely bring the mower to a standstill, since this requires depressibililty along the required braking distance. The second impact detector itself does not yet provide this depressibility, at least not necessarily. If this were the case, then such an impact detector for the desired speeds of travel would be very large, heavy and clumsy. In addition, during mowing, a part of the depression of the first impact detector will be used by the fact that the plants already depress the second impact detector in its entirety, i.e. without detecting a collision. Therefore, in case of an actual collision during mowing a smaller and more importantly, unknown depressibility remains. In addition, when the mowing vehicle only drives and is not mowing, it is desirable, in principle, to make it drive as quickly as possible, at least more quickly than during mowing, whereas during mowing the effect of depression of the first impact detector by the plants occurs.

Another drawback of a collision protection of the type in which only a first collision protection is used, is the fact that, on bumpy terrain, the entire "bumper" will shake, so that it could shake beyond the switching point and thus activate the emergency stop, without a collision having occurred. In this case, making adjustments to ensure it is triggered less easily, using stronger springs or the like, is not satisfactory, since it negatively impacts on the safety requirements. According to the invention, a second impact detector is used which is able to indicate if an impact/collision has actually occurred, so that shaking no longer has a disruptive effect.

SUMMARY OF THE INVENTION

By combining the two kinds of impact detector, a collision protection is obtained which ensures that the speed of the mowing vehicle during mowing is lower than when it is only driving, so that, despite the first impact detector being depressed, and thus in fact becoming inoperative, it is still safe for the mowing vehicle to drive: in case of a collision involving a "hard" obstacle, the second collision protection will become active. In case the speed was the (higher) speed of travel, the available braking distance will still be equal to the braking distance associated with the first impact detector. After all, the first switch did not yet emit a signal and has therefore not been depressed, and the full depressibility and braking distance are available. In case the first switch did emit a signal due to the fact that the first collision protection was already depressed beyond the switching point, such as in particular during mowing, the speed has already been reduced to the lower speed of travel by the control unit. At this speed, the available braking distance is shorter, but still safe, because it was chosen in accordance with the second impact detector, as a result of which injuries or damage to people, animals and objects are able to be prevented in an efficient manner. Incidentally, in this case, the switch may be a switch which only emits a signal if depressed beyond a switching point, but may obviously also be a sensor or the like, which continuously or repeatedly emits a signal, such as on the basis of a measured distance or angular rotation, wherein the control unit "switches" internally if the signal falls below or exceeds a certain value. In this case, the switch is formed by the sensor and the control unit.

In this case, it is explicitly pointed out that the inventive idea may also be applied to other vehicles than autonomous self-propelled vehicles. In fact, all the measures mentioned above and those mentioned below are suitable for all vehicles which have to drive through tall plants and which are provided with an emergency stop which reacts to impact detection. Such vehicles may be, for example, autonomous vehicles such as fertilizing vehicles or surveillance vehicles, but also driver-operated vehicles, such as driver-operated mowing vehicles, fertilizing vehicles or surveillance-vehicles. Although with driver-operated vehicles, an emergency stop is easily cancelled or even prevented, application of the present inventive idea will result in a less jerky driving behavior of the vehicle involving fewer stops, and will thus lead to a calmer ride for the driver. The invention will be explained below by means of the autonomous self-propelled mowing vehicle, but taking the above into account.

Particular embodiments of the mowing vehicle according to the invention are described in the dependent claims, as well as in the following part of the introductory description.

In particular, the speed of travel is chosen in such a way that the braking distance of the mowing vehicle after receiving the second signal at this speed of travel is at most equal to a horizontal distance between the first switching point and said stop. Thus, the first impact detector, also referred to below as the first bumper, is at most depressed completely upon impact, so that injuries or damage to people and objects are able to be prevented in an efficient way. In this case, the qualification "at most" refers to circumstances where the driving surface is of the usual quality, such as a field or a road. Extraordinary circumstances, such as ice or oil on the road have not been taken into account in this case.

In particular, the mowing speed, that is to say the speed during mowing, at least during detection of resistance on the first impact detector, is chosen in such a way that, upon receiving the second signal, the braking distance of the mowing vehicle is at most equal to the depressibility minus the depression threshold. This ensures that, in case of a collision with an object, if the first impact detector is completely or partly depressed, there still remains sufficient depression to ensure that the, albeit shorter, braking distance falls entirely within the depressibility of the second impact detector. In addition, if the first impact detector has not been depressed completely yet, there is a safety margin in the form of the remaining depressibility of this first impact detector, provided this is greater than the depressibility of the second impact detector.

In embodiments, the first impact detector comprises a parallelogram construction. This is a very simple yet reliable construction which allows considerable travel without taking up a lot of volume. Nevertheless, other constructions, such as a compressible spring or cylinder, are certainly possible, as long as they have a depressibility in the horizontal direction, counter to a spring force.

In particular, the mowing vehicle furthermore comprises a suspension feature, in particular a spring device or hydraulic or pneumatic cylinder connected to the frame and to the first impact detector and/or to the second impact detector. This suspension feature, as known per se for mowing beams and the like, ensures smooth ground-contour following, which, on the one hand, prevents the mowing device and also the bumper from reaching excessive heights above the ground in bumpy terrain and from digging themselves into the ground.

In embodiments, the second impact detector comprises a deformable and locally depressible body which is provided with at least two parallel conductors, wherein the second switch is configured to emit the second signal if the resistance between the two conductors drops below a predetermined threshold value, or an electrical equivalent, such as an increase in the current through the conductor(s). This construction ensures that a collision with an obstacle, which locally results in a depression, leads to a perceptible signal which should lead to the vehicle stopping in all circumstances. After all, there is an actual obstacle rather than only plants to be mowed, or another resistance below a depression or stopping threshold. The obstacle thus causes the depression threshold to be exceeded locally. Obviously, alternatives are possible, such as an impact detector which only contains a circuit which may be broken by depression. In this case, a greatly increased resistance, decreasing current, etc., lead to the desired impact signal.

In particular, the deformable and locally depressible body comprises over its width a foam, at least one container filled with gas or another fluid or several spring bodies. This is able to ensure that that the second impact detector or "bumper" is sufficiently soft, so that a collision is detected, but does not necessarily have to result in damage, such as scratches on objects, or injuries to people or animals. It also reduces the forces on the mowing vehicle in the event of an impact compared to a mowing vehicle comprising only the first impact detector. After all, in principle, the latter is a rigid construction with a considerable mass which literally has to be made to move in one instant. The forces which occur in this case are much greater than in the case of a much more gradual acceleration, as is the case with the damping action of the foam. The second impact detector may be compared in a way to a mattress, such as an inflatable bed, waterbed, pocket spring mattress or foam mattress. Again, it is pointed out that other impact detectors with similar properties are not excluded, such as in particular other locally pressure-sensitive impact detectors.

It should be noted here that only having a second impact detector, such as a thick foam, is not attractive. After all, the thickness of that foam will then have to be at least equal to the braking distance. In practice, in case of impact, the counterforce in the foam rises quickly, as it is not endlessly compressible. As a result, the actual thickness has to be much greater, such as twice as thick as the braking distance.

Depending, of course, on the speed and the braking power of the vehicle, this may be a considerable thickness, such as 60-70 cm. This in turn leads to a risk of sagging, which necessitates additional countermeasures, and it also leads to a relatively heavy bumper, despite the low specific weight of foam.

In attractive embodiments, the second impact detector is arranged on the first impact detector. This ensures optimum cooperation between the first and second impact detectors, although this is not obligatory. Incidentally, in this situation it holds true that, if the first impact detector emits a signal and the mowing vehicle drives at the mowing speed for this or for another reason, the distance available as braking distance is at most equal to the depressibility of the second impact detector minus the depression threshold, but plus the remaining depressibility of the now at least partly depressed first impact detector.

In particular, the mowing vehicle comprises a sensor which is connected to the control unit for determining the distance over which the first impact detector is depressed, and the control unit is configured to adjust the speed of travel, in particular the mowing speed, in dependence on the determined distance. The underlying thinking is that, if the first impact detector is only depressed to a slight degree, additional braking distance remains, as has already been mentioned briefly above. In such a case, the mowing vehicle can then drive proportionately more quickly. For example, the sensor, in case of a parallelogram construction as first impact detector, comprises an angular rotation sensor, or in other cases a simple depression distance meter.

In embodiments, the mowing vehicle furthermore comprises a gathering device and a holder for accommodating mowed plants. Such mowing vehicles are suitable, for example, to mow feed and to then transport it to a consumption location, in particular an animal shed for animals which eat the mowed plants. The invention is of greater relevance here due to the greater total weight of the vehicle comprising the gathered load of mowed plants, as a result of which the impact of the mowing vehicle will be proportionally greater.

In particular, the mowing vehicle furthermore comprises a dispensing device for dispensing mowed plants from the holder, in particular a dispensing belt which is placed at right angles to the direction of travel. These vehicles thus move near or even in an animal shed, which may increase the risk of collisions and reliable collision prevention is even more important.

BRIEF DESCRIPTION OF THE DRAWINGS

The invention will now be explained in more detail by means of an exemplary embodiment and the drawing, in which.

DETAILED DESCRIPTION OF THE INVENTION

Figure 1:
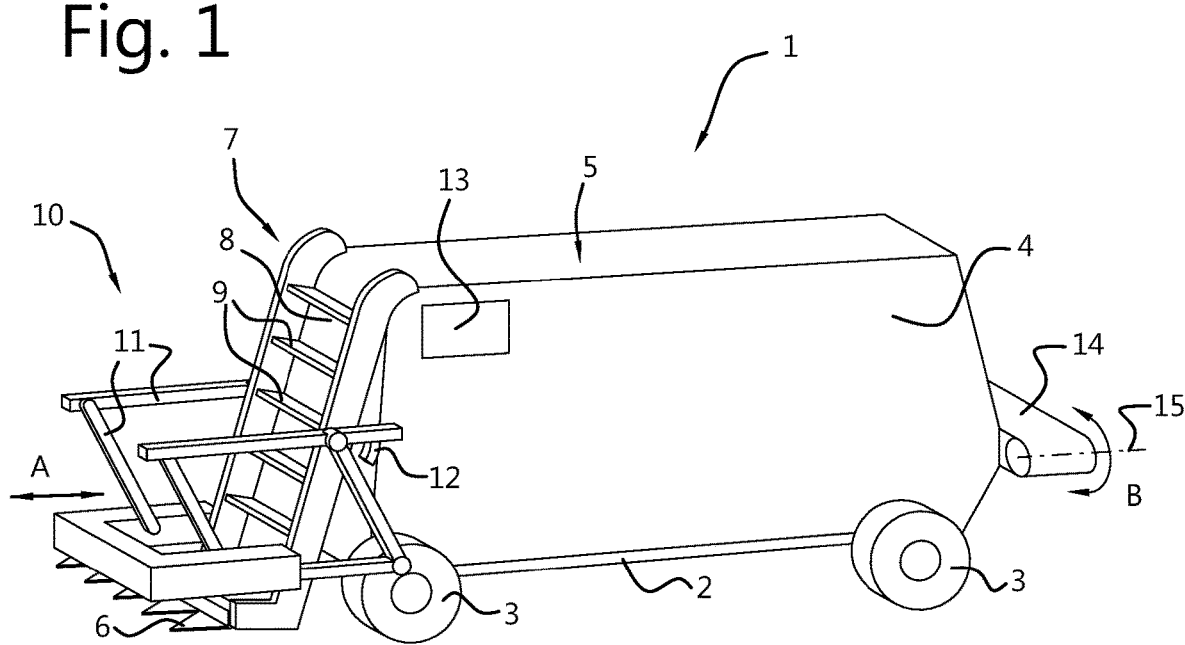
FIG. 1 diagrammatically shows a perspective view of a mowing vehicle according to the invention.

FIG. 1 diagrammatically shows a perspective view of a mowing vehicle 1 according to the invention. The mowing vehicle 1 comprises a frame 2 with a drive mechanism in the form of wheels 3 as well as a box 4 having an internal space 5 for accommodating mowed plants. Reference numeral 6 denotes a mowing device, and reference numeral 7 denotes an escalator device comprising a belt 8 with partitions 9. Via a parallelogram construction 11, a bumper 10 is movable in the direction of the double arrow A up to a stop 12. Reference numeral 13 denotes a control unit. A discharge belt 14 rotates around rollers which are rotatable about an axle 15 (only one is illustrated) in the direction of the double arrow B.

Under the control of the control unit 13 and by means of the drive mechanism comprising wheels 3, the mowing vehicle 1 can drive across a field with plants to be mowed. It is provided, for example, with a GPS or other navigation means, such as hodometry on the wheels (not shown). Since the mowing vehicle 1 is autonomous and self-propelled, a bumper device has to be provided for safety reasons. This has only been shown partly here, more particularly from the front, and is denoted here by reference numeral 10. Other safety measures, such as side and rear bumpers, have not been shown here for the sake of clarity, but are obviously provided if desired. The front bumper device will be explained in more detail below. Nevertheless, it should be indicated here that the bumper is depressible in the direction of the double arrow A up to the stop 12, and is ground-contour following, that is to say has a suspension feature, having a parallelogram construction 11.

Plants are mowed by means of the mowing device 6, such as grass or alfalfa. These plants may either remain behind on the land in order to be gathered by another vehicle or, as is the case in this example, to be gathered by an escalator device 7 and raised in order to be accommodated in the space 5 of the box 4. To this end, the escalator device 7 comprises, for example teeth on a rotating roller (not shown here), as well as a belt 7 which is provided with partitions 8 in order to carry the mowed plants along to the top.

The entrained mowed plants may be dispensed again by means of a dispensing device, here in the form of a transverse conveyor belt 14 which rotates about two rollers, each rotatable about a respective axle 15 according to the arrow B. The mowing vehicle 1 may perform this dispensing, for example, near cattle. Thus, the mowing vehicle 1 may mow plants when needed, and subsequently drive to the cattle and there dispense the mowed plants, such as at a feed fence. In this way, the mowing vehicle 1 can take fresh feed to the cattle at any desired moment.

Figure 2:
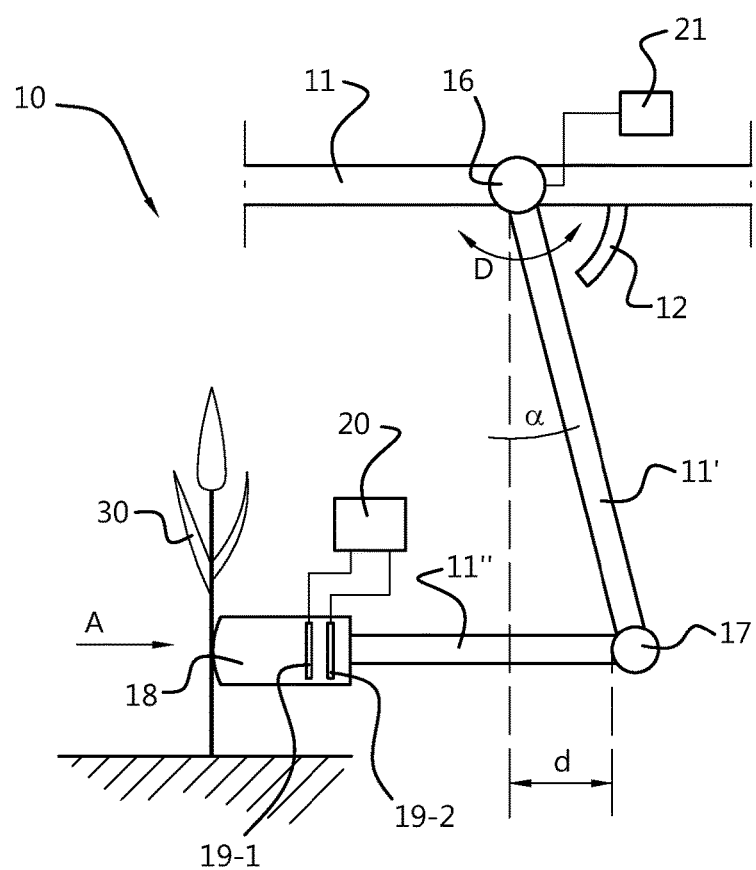
FIG. 2 diagrammatically shows a side view of a detail of the mowing vehicle from FIG. 1.
Figure 3:
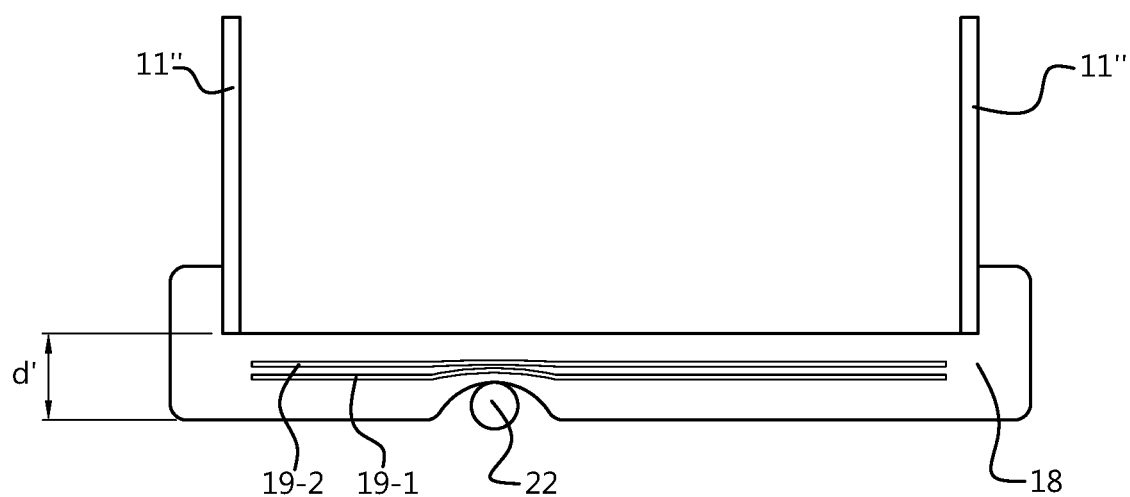
FIG. 3 diagrammatically shows a top view of a detail of the mowing vehicle from FIG. 1.

As stated before, the mowing vehicle 1 is able to drive autonomously under control of the control unit 13. In order to ensure safety, the mowing vehicle 1 is provided, inter alia, with a bumper device 10. FIG. 2 diagrammatically shows a side view of a detail of the mowing vehicle from FIG. 1, in particular of the bumper device 10 thereof. FIG. 3 diagrammatically shows a top view thereof. Identical or similar components herein are denoted by the same reference numerals.

The bumper device 10 comprises the parallelogram construction 11, 1', 11" (pro parte), with hinges 16 and 17, the stop 12, foam packet 18, a first and second conductor 19-1 and 19-2, a resistance meter 20 and an angle sensor 21. Reference numeral 22 denotes an obstacle and reference numeral 30 denotes a tall plant.

The bumper device 10 acts as an impact absorber and comprises two impact detectors, each of which separately also have an impact-absorbing function. The first impact detector/absorber is formed by the parallelogram construction with beams 11, 11', 11", which are rotatable about four hinges and of which two are shown here, i.e. 16 and 17. The second impact detector/absorber is formed by two conductors 19-1 and 19-2, which are incorporated in a foam packet 18 and between which there is an electrical resistance which is measured by the resistance meter 20. As a result of a pressure, the foam packet 18 will be compressed. When the local pressure is sufficiently large, the first and the second conductors 19-1 and 19-2 will come so close to one another, such as come up against each other, that the resistance meter 20 drops below a threshold value, after which the resistance meter can emit a collision signal to the control unit. Obviously, equivalents, such as a sufficiently decreasing voltage or a sufficiently changing capacitance between two plates, etc., are also possible. In any case, in case of such a collision signal, the control unit deduces that a collision with a (fixed or hard) obstacle 22 has taken place and switches the emergency stop on again and switches the drive mechanism off.

As has already been indicated in FIG. 1, the construction of the first impact detector is depressible up to the stop 12, as has been illustrated here. In this case, this leads to an angular rotation the beam 11' over an angle α in the direction of the arrow D around the hinge 16. This angular rotation is measured by angle sensor 21. The measured angular rotation α is an indication of the depression d of the first impact detector/parallelogram construction. At a certain rotation $\alpha_{stop}$, corresponding to a certain depression, the prior-art control unit will deduce a collision with an obstacle has taken place and the control unit will stop the drive mechanism. The braking distance associated with the current speed of the mowing vehicle is then in principle at most equal to the maximum depression d, minus the depression associated with $\alpha_{stop}$. However, according to the invention, this control unit has been enhanced.

In practice, the mowing vehicle 1 will mow plants, such as tall grass, alfalfa, etc. These plants, diagrammatically indicated in FIG. 2 by reference numeral 30, push against the bumper device 10. This may result in the plants 30 already exerting a total force on the first impact detector 11, 11', 11" such that it is pushed beyond $\alpha_{stop}$. In the prior art, the mowing vehicle would then already be stopped by the control unit. This is undesirable. It should be noted that, according to the invention, if the first impact detector has been pushed beyond $\alpha_{stop}$, it is still necessary for the second impact detector to emit a signal, i.e. the first conductor 19-1 and the second conductor 19-2 have to be pushed sufficiently close together. Only then does the control unit deduce that a collision has taken place and activates the emergency stop. However, the available braking distance after depressing the first impact detector beyond $\alpha_{stop}$ has become smaller. After all, before the first impact detector was depressed, this was in principle the distance d+the depressibility d' of the second impact detector. After the first impact detector has been depressed, the distance d' remains for the sake of safety, if the depression of this first impact detector is not measured. The first available braking distance d+d' is associated with a maximum speed $v_{max1}$, and the remaining braking distance d' is associated with a lower maximum speed $v_{max2}$. The control unit then adjusts the speed of the mowing vehicle 1 when receiving a signal from the optional angle sensor 21, or another signal from the first impact detector, from a speed which is at most $v_{max1}$ to a speed which is at most $v_{max2}$. If the depression of the first impact detector is however measured, such as by means of the angle sensor 21 or by means of another meter, such as a linear depression meter, then the maximum speed is able to be adjusted to the remaining available braking distance. The higher speed is available during normal driving, mowing of low plants which do not push against the first impact detector and optionally also during reversing during mowing operations, because then no mowing actually takes place.

The invention claimed is:

1. An autonomous self-propelled mowing vehicle, comprising a frame fitted with:
a drive mechanism for driving the mowing vehicle in a direction of travel at a speed of travel during driving;
a mowing device for mowing plants situated on the land;
a bumper device;
a control unit for the mowing vehicle which is operatively connected to the bumper device;
a gathering device; and
a holder for accommodating mowed plants,
wherein the bumper device comprises:
a first impact detector; and
a second impact detector,
wherein the first impact detector is depressible as a whole along a path with respect to the frame up to a stop on account of a force acting thereon, and is provided with a first switch which is connected to the control unit and is configured to emit a signal to the control unit in response to the impact detector being pushed in beyond a first switching point,
wherein the second impact detector is deformable and locally depressible beyond a depressibility on account of a force acting thereon, and is provided with a second switch which is connected to the control unit and which emits a second signal to the control unit in response to the second impact detector being depressed at least beyond a predetermined depression threshold, and
wherein the control unit is configured:
to stop the drive mechanism upon receiving the second signal; and
to regulate the drive mechanism in such a way that the speed is reduced to a lower speed of travel upon receiving the first signal without receiving the second signal.

2. The mowing vehicle as claimed in claim 1, wherein the speed of travel is chosen in such a way that a braking distance of the mowing vehicle after receiving the second signal at this speed of travel is at most equal to a horizontal distance between the first switching point and said stop.

3. The mowing vehicle as claimed in claim 1, wherein the speed of travel is chosen in such a way that, upon receiving the second signal, a braking distance of the mowing vehicle is at most equal to the depressibility minus the depression threshold.

4. The mowing vehicle as claimed in claim 1, wherein the first impact detector comprises a parallelogram construction.

5. The mowing vehicle as claimed in claim 1, further comprising a suspension feature.

6. The mowing vehicle as claimed in claim 1, wherein the second impact detector comprises a deformable and locally depressible body which is provided with at least two parallel conductors, wherein the second switch is configured to emit the second signal in response to a resistance between the two conductors dropping below a predetermined threshold value.

7. The mowing vehicle as claimed in claim 6, wherein the deformable and locally depressible body comprises, across a width thereof, a foam, at least one container filled with gas or another fluid or several spring bodies.

8. The mowing vehicle as claimed in claim 1, wherein the second impact detector is arranged on the first impact detector.

9. The mowing vehicle as claimed in claim 1, further comprising a sensor which is connected to the control unit for determining the distance over which the first impact detector is depressed, and wherein the control unit is configured to adjust the speed of travel in dependence on the determined distance.

10. The mowing vehicle as claimed in claim 2, wherein the second impact detector comprises a deformable and locally depressible body which is provided with at least two parallel conductors, wherein the second switch is configured to emit the second signal in response to a resistance between the two conductors dropping below a predetermined threshold value.

11. The mowing vehicle as claimed in claim 1, further comprising a dispensing device for dispensing mowed plants from the holder.

12. The mowing vehicle as claimed in claim 4, further comprising a suspension feature, the suspension feature being a spring device or hydraulic or pneumatic cylinder connected to the frame and to at least one of the first impact detector and the second impact detector.

13. The mowing vehicle as claimed in claim 11, wherein the dispensing device for dispensing mowed plants from the holder is a dispensing belt which is placed at right angles to the direction of travel.

14. The mowing vehicle as claimed in claim 2, wherein the speed of travel is chosen in such a way that, upon receiving the second signal, the braking distance of the mowing vehicle is at most equal to the depressibility minus the depression threshold.

15. The mowing vehicle as claimed in claim 2, wherein the first impact detector comprises a parallelogram construction.

16. The mowing vehicle as claimed in claim 3, wherein the first impact detector comprises a parallelogram construction.

17. The mowing vehicle as claimed in claim 3, further comprising a suspension feature, the suspension feature being a spring device or hydraulic or pneumatic cylinder connected to the frame and to at least one of the first impact detector and the second impact detector.

18. An autonomous self-propelled mowing vehicle, comprising a frame fitted with:
   a drive mechanism for driving the mowing vehicle in a direction of travel at a speed of travel during driving;
   a mowing device for mowing plants situated on the land;
   a bumper device; and
   a control unit for the mowing vehicle which is operatively connected to the bumper device,
   wherein the bumper device comprises:
   a first impact detector; and
   a second impact detector,
   wherein the first impact detector is depressible as a whole along a path with respect to the frame up to a stop on account of a force acting thereon, and is provided with a first switch which is connected to the control unit and is configured to emit a signal to the control unit in response to the impact detector being pushed in beyond a first switching point,
   wherein the second impact detector is deformable and locally depressible beyond a depressibility on account of a force acting thereon, and is provided with a second switch which is connected to the control unit and which emits a second signal to the control unit in response to the second impact detector being depressed at least beyond a predetermined depression threshold, and
   wherein the control unit is configured:
   to stop the drive mechanism upon receiving the second signal; and
   to regulate the drive mechanism in such a way that the speed is reduced to a lower speed of travel upon receiving the first signal without receiving the second signal, and
   wherein the autonomous self-propelled mowing vehicle further comprises a suspension feature, the suspension feature being a spring device or hydraulic or pneumatic cylinder connected to the frame and to at least one of the first impact detector and the second impact detector.

19. An autonomous self-propelled mowing vehicle, comprising a frame fitted with:
   a drive mechanism for driving the mowing vehicle in a direction of travel at a speed of travel during driving;
   a mowing device for mowing plants situated on the land;
   a bumper device; and
   a control unit for the mowing vehicle which is operatively connected to the bumper device,
   wherein the bumper device comprises:
   a first impact detector; and
   a second impact detector,
   wherein the first impact detector is depressible as a whole along a path with respect to the frame up to a stop on account of a force acting thereon, and is provided with a first switch which is connected to the control unit and is configured to emit a signal to the control unit in response to the impact detector being pushed in beyond a first switching point,
   wherein the second impact detector is deformable and locally depressible beyond a depressibility on account of a force acting thereon, and is provided with a second switch which is connected to the control unit and which emits a second signal to the control unit in response to the second impact detector being depressed at least beyond a predetermined depression threshold, and
   wherein the control unit is configured:
   to stop the drive mechanism upon receiving the second signal; and
   to regulate the drive mechanism in such a way that the speed is reduced to a lower speed of travel upon receiving the first signal without receiving the second signal,
   wherein the speed of travel is chosen in such a way that a braking distance of the mowing vehicle after receiving the second signal at this speed of travel is at most equal to a horizontal distance between the first switching point and said stop, and
   wherein the autonomous self-propelled mowing vehicle further comprises a suspension feature, the suspension feature being a spring device or hydraulic or pneumatic cylinder connected to the frame and to at least one of the first impact detector and to the second impact detector.

* * * * *